United States Patent [19]

Marron et al.

[11] 4,093,435
[45] June 6, 1978

[54] TOTAL HEAT ENERGY EXCHANGERS

[75] Inventors: Albert J. Marron, Spring Lake; Walter J. Markowski, Cranford, both of N.J.

[73] Assignee: Wing Industries Inc., Cranford, N.J.

[21] Appl. No.: 596,642

[22] Filed: Jul. 17, 1975

Related U.S. Application Data

[63] Continuation-in-part of Ser. No. 418,364, Nov. 23, 1973, abandoned.

[51] Int. Cl.$^2$ .................. B01D 53/06; F28D 19/04
[52] U.S. Cl. ................................. 55/269; 55/390; 55/408; 165/8; 165/10
[58] Field of Search ............... 55/268, 269, 387, 388, 55/390, 408; 165/7, 8, 10

[56] References Cited

U.S. PATENT DOCUMENTS

| | | | |
|---|---|---|---|
| 3,155,153 | 11/1964 | Axelsson | 165/8 |
| 3,251,402 | 5/1966 | Glav | 55/390 X |
| 3,398,510 | 8/1968 | Pennington | 55/163 |
| 3,664,095 | 5/1972 | Asker et al. | 55/387 |
| 3,702,156 | 11/1972 | Rohrs et al. | 55/390 X |

Primary Examiner—John Adee
Attorney, Agent, or Firm—Brooks, Haidt, Haffner & Delahunty

[57] ABSTRACT

Rotary regenerative total heat energy exchanger having an asbestos-free heat exchange media formed by spirally winding flat and corrugated webs of aluminum foil and/or fully bleached, 45 lb. Kraft paper constituted by 84% fibres and 16% salts. The contained salts are 90% ammonium sulfide and 10% diammonium phosphate. Wheel thickness for efficient transfer of both sensible heat and latent heat with minimal air pressure drop across the wheel is a multiple of from 100 to 400, preferably 125 to 200, times the flute height of the corrugation web of the media. Although media may be substantially all-paper, preferred embodiments provide media having both a flat web and a corrugated web of aluminum foil, a pair of paper webs being disposed respectively on the opposite surfaces of either the flat foil web or the corrugated foil web. Contiguous webs need not be adhesively secured together although, in modified embodiments, strips of neoprene rubber or silicate adhesive may be disposed between webs, or driable neoprene can be sprayed on end faces of wheel. Annular metal bands may be disposed at intermediate radial locations to strengthen the media. A metal rim forms the outer periphery of the wheel, and angularly spaced apart spokes are set into the media and extend radially between the hub and the rim. End edges of the peripheral rim, media, intermediate annular bands, and spokes are flush with each other.

24 Claims, 11 Drawing Figures

TOTAL HEAT ENERGY EXCHANGERS

CROSS-REFERENCE TO RELATED APPLICATION

This application is a continuation-in-part of our copending application Ser. No. 418,364, filed Nov. 23, 1973, now abandoned.

FIELD OF THE INVENTION

This invention relates to regenerative devices by which moisture and/or latent and sensible heat are exchanged between two streams of fluid, such as between the fresh intake air and exhaust air streams in a make-up air supply system, for the purpose of reducing the amount of heat and moisture as would otherwise be necessary to add to, or take from the incoming air to temper it for use. More particularly, the invention relates to the composition and fabrication of heat and moisture transfer elements or matrices for incorporation into such regenerative devices.

Although the invention may have application to pile-type regenerators for such purposes and to other uses such as in the field of dehumidification, it was made during an attempt to improve the energy exchange media in rotary-type regenerative exchangers for use in total heat energy recovery and exchange devices and will therefore be described in connection with such use.

Such a rotary regenerator, commonly referred to as a heat exchange "wheel", is mounted spanning across, and for rotation between adjacent but separate air supply and exhaust ducts. The wheel is primarily constituted by an air-permeable matrix or media through which both the incoming and outgoing airstreams pass, the matrix being capable of absorbing moisture and/or thermal energy from the exhaust air stream for subsequent release, upon further rotation, to the incoming air supply stream which is to be tempered. The wheel is used to recover heat and moisture from relatively higher temperature exhausted air for transfer to a cool, dry incoming airstream, and also to cool and dehumidify a hot, moist incoming airstream by extracting moisture and heat energy and transferring the energy to a relatively cooler and drier exhaust airstream such as in an air conditioned building or similar place.

BACKGROUND AND OBJECTS OF THE INVENTION, AND THE PRIOR ART

One of the most effective materials from which the media of such total heat energy exchange wheels is made is asbestos in the form of alternately flat and corrugated asbestos paper sheets, preferably impregnated with a hygroscopic salt such as lithium bromide or lithium chloride for improved transfer of moisture. Although such heat and moisture exchange media have also been made of cellulosic paper, asbestos has been considered generally superior to paper or other material, at least in terms of the latent heat and moisture exchange rates and efficiencies of comparably sized media. See, for example, U.S. Pat. No. 3,398,510 (Pennington) in which a comparison is made between the characteristics of cellulosic paper and asbestos paper in such wheels, albeit as used for moisture transfer, rather than for total heat exchange. However, question has arisen regarding whether the use of such asbestos material in direct contact with the stream of makeup air which is being supplied to living or working quarters may permit even extremely minute quantities of harmful asbestos fibres to be introduced into environmental air being breathed by human beings. Accordingly, a need has arisen for, and it is therefore a principal object of the invention to provide an efficient total heat energy exchange apparatus whose heat exchange media is made from materials other than asbestos.

However, it is also a purpose to provide a total energy exchange media made from materials such that the wheel will have its own desirable moisture and heat energy absorption and exchange characteristics for a wide range of applications, and in wheels of various sizes from as small as about 28 inches to as large as about 12 feet in diameter, considering that the wheel thickness or depth should be retained within a reasonable limit of, say, less than 2 feet.

It is further intended by the invention to establish parameters for use in connection with such wheels regarding the length of the airstream passages extending through the depth or thickness of the wheel with relation to the diameter of such air passages, thus to provide optimum sensible and latent heat transfer efficiencies with minimal fluid flow losses and consequent minimal air pressure drop across the wheel, yet with openings whose size is adequate to minimize the possibility for clogging of the passages by flowing particulate matter.

Because it is inexpensive and does have indicated desirable heat exchange characteristics, the present invention further contemplates that such media might be made wholly or partially of cellulosic paper, provided the composition of the paper, either by itself or together with any other materials incorporated in the media, is such as will impart the desired operating characteristics, yet resist or retard fire and wheel distortion during both fabrication and use, and have adequate wet strength so as not to sag or tear apart when exposed to high humidity conditions. To impart such improved heat exchange characteristics as well as strength to the wheel structure, the invention also contemplates that an appropriate mass of metal might also be incorporated into the wheel structure.

Further, a wheel having such improved media must be constructed so as to adequately retain the media in place during use, and the media must be durable to provide reasonably long-life service under the normally to be encountered conditions of heat and moisture. Of course, the wheel should be relatively inexpensive to fabricate and maintain.

Total heat energy recovery and exchange devices having regenerative exchange wheels whose packing or media is made entirely of cellulosic paper, are known. For example, in Canadian Patent No. 629,879 (Munters) wheels made of spirally wound, alternately flat and corrugated webs of paper for the purpose are described.

Devices for the recovery and exchange of only sensible heat are commonly provided with all-metal foil wheels formed by spirally winding either stainless steel foil or aluminum foil about a hub. See, for example, U.S. Pat. No. 3,702,156 (Rohrs et al), and Canadian Patent No. 629,879 (Munters).

Regarding previous all-paper media, although they have the advantage of being far less expensive than those made of asbestos paper, they do not always have fire retardant and bacteriostatic characteristics as are desirable, and are difficult to manufacture especially in spirally wound form and having large size on the order of, say, 12 ft. in diameter. In addition, it has been believed necessary to either coat or especially treat the paper material after its manufacture to improve its sensible heat and/or latent heat and/or moisture transfer capabilities, or to impart strength to withstand the temperature and humidity conditions to which the paper will be subjected during use. See, for example, U.S. Pat. No. 3,664,095 (Asker et al). Moreover, in use the devices are exposed to dynamic forces of the fluids which pass through it, which promotes wear and tear, and they are sometimes impinged by particulate matter such as dust carried by the flowing fluid, which also tends to clog the narrow air passages through the wheel.

U.S. Pat. No. 3,155,153 (Axelson) describes a technique for impregnating the end faces of corrugated paper wheels (or wheels of other organic or inorganic materials) with a stiffening material for imparting strength to resist deterioration by such dynamic fluid forces and particle impingement, and which also serves to bond together the successive convolutions of the wound corrugated paper. Further with regard to the manner of construction of such wheels, the above-referred to U.S. Pat. No. 3,702,156 (Rohrs et al) describes an effective technique for fabricating sensible heat transfer wheels in which, after winding, the spirally wound continuous strips of alternately flat and corrugated metal foil are grooved along their end faces to receive an appropriate number of radial spokes to form a wheel which is entirely flush across its end faces, as is a feature of the present invention. The flush disposition of the spokes and media at the end faces is advantageous in that it improves the strength of such wheels, and also facilitates the forming of an effective air seal at the interfaces between the moving wheel and the ends of the stationary airstream duct dividers which usually form a part of the frame within which the wheel is mounted.

Briefly describing the presently preferred embodiment of an air-to-air total heat energy recovery and transfer wheel in accordance with the invention, respective continuous flat and corrugated strips of aluminum foil, together with a pair of paper strips respectively conforming to, and disposed on each side of either the corrugated foil or the flat foil strip, are concurrently and spirally wound on to a metal hub. In an alternative embodiment, an all-paper media is provided by winding single-faced corrugated paperboard on the hub.

In all embodiments it has been found that, to impart the desired characteristics, the paper is preferably a fully bleached Kraft paper of about 45 pound density (i.e., 45 lbs. per 500 sheets each measuring 24 inches × 30 inches), having thickness of from about 4 mils to about 6 mils, preferably 0.0045 inch (4½ mils), and whose ultimate composition is 84% fibres and 16% contained salts, the salts being 90% ammonium sulfide and 10% diammonium phosphate. Although stainless steel or other sheet metal might be used, it has been found that both the flat and the corrugated metal strips or webs as are incorporated in the preferred media are preferably of a high purity aluminum of medium hardness.

The size of the opening of the somewhat circular air passages formed by the sine-shaped corrugations of the corrugated web in the media is from about 0.055 inch to about 0.120 inch, and the length of the air passages is from 100 to 400 times such corrugated height. More particularly, where the wheel is made from two plies of metal foil and two paper plies, as in the preferred embodiment of the invention, it has been found that the height of the corrugations should be from about 0.055 inch to about 0.065 inch, preferably 0.060 inch, and that the length of the air passages should be from about 125 to 150, preferably about 135, times such height (i.e., about 8 inches) whereas in the case of the all-paper embodiment, the corrugation height should be from about 0.06 inch to about 0.12 inch, preferably 0.10 inch, and the length of the passage is preferably 200 times that height (i.e., about 20 inches). In this regard, it has been found that the maintenance of such L/D ratios, (where L is the common length of the tubular passages formed by the corrugations through the wheel depth, and D is the passage diameter corresponding to the flute height of the corrugations) is important for the attainment of high sensible and latent heat energy recovery effeciencies with minimal pressure drop across the wheel.

In the modified form of the invention in which the total heat energy transfer media is made entirely from strips of alternately flat and corrugated paper, the strips are preferably adhesively secured together by a silicate adhesive as is conventional in the making of single-faced corrugated paperboard. Thus, it is convenient to form the media from a web of previously made single-faced corrugated paperboard. It will be noted that, in addition to its latent and sensible heat transfer capabilities, the specified paper of which the media is made, so treated as aforesaid, has a fire-resistant characteristic and is also bacteriostatic.

In such all-paper embodiment, the successive convolutions of the corrugated paperboard web need not be adhered to each underlying convolution of the web. However, to impart stiffness to the media, render it bacteriocidal, and to improve the sensible heat transfer capability of the wheel, a dryable neoprene rubber, which also functions as an adhesive, may be applied between the convolutions, either in several laterally spaced apart strips continuously applied as the paper is wound around the hub, or preferably by an airless spray application, or a dipping or painting-on application of the liquid neoprene to the end faces of the wheel after the corrugated paperboard material has been wound tightly on the hub. Thus, whether applied by dipping or spraying into the end faces or as continuous strips during the winding of the paper material, the adhesive is deposited in the form of at least a pair of adhesive strips extending inwardly at or near the end faces of the wheel. In this regard, an airless spray application of the neoprene penetrates the end faces of the wheel to a depth of about 5 inches or more. When applied by roller application during the winding of the corrugated paper material, one more strip of adhesive is preferably located centrally within the width of the corrugated paper web, such being desirable in wheels having considerable thickness.

To render the wheel bacteriocidal, such liquid neoprene may be similarly applied to the end faces of the preferred, combination metal foil-and-paper wheel.

In a still further modified form of the invention, a single, thin metal foil strip, preferably aluminum foil, of the same or slightly greater width as the corrugated paperboard web, is concurrently wound for the purpose of improving the sensible heat transfer capability of the wheel for particular wheel applications. Although not always necessary, in this embodiment, strips of adhesive are preferably disposed on both sides of the metal foil strip so that the interleaved metal foil is adhesively secured to both the flat paper ply and the corrugated ply of the wound, single-faced corrugated paperboard material.

With reference to any of the described embodiments, the winding of the media around the wrapping hub may be discontinued when a selected radius of from about 12 inches to about 24 inches has been achieved so that an annular metal band, having width equal to the depth of the wheel, may be tightly attached around the media at that location. Spiral winding of additional strips or webs of the media-forming material is then continued around the exterior of the annular metal band until a predetermined additional radius of the wheel is reached, whereupon a similar annular metal band is fastened tightly around the second media area. Any number of such intermediately located, annular metal bands can be applied at each preselected interval of wheel radius. When the desired wheel diameter is ultimately attained, a somewhat heavier peripheral metal rim is fastened tightly around the built-up structure.

To retain the wound media and annular metal bands in place, radially extending metal spokes are attached between the hub and peripheral rim on both sides of the wheel. Both for the purpose of providing a flush face at either side of the wheel and for imparting rigidity to the face of the spirally wound media itself, each radial spoke is placed within a milled radial slot in the face of the wheel, the slot extending between the hub and the peripheral rim. Each spoke fits closely within its associated radial slot, and is welded to the metal hub, the metal peripheral rim, and to each of the intermediate annular metal bands of the wheel. Where the media itself includes metal foil, the spokes are additionally welded to the end faces of the foil convolutions. Where the media is all paper, each spoke is coated with an adhesive, such as an epoxy resin, before it is placed within its media slot so that each ply of the corrugated paper media will be adhesively secured thereto.

The referred to preferred L/D ratio of from about 125 to 200 has been found to be optimum from the standpoint of total heat energy recovery efficiencies, cost, and convenience of handling the resulting size media during fabrication. That is, it has been found that the wheel dimensions resulting from such selected optimum ratio cause the wheel to be less cumbersome to build. Moreover, to avoid clogging by the deposit of particulate matter under normally encountered conditions, the diameter of each air passage through the wheel should be not less than about 0.055 or 0.06 inches.

It should also be noted that, in any of the described embodiments, the sensible heat transfer efficiency of the matrix is somewhat higher than its latent heat transfer efficiency. Thus, as represented on a psychrometric chart the three significant operating points representing the temperature and moisture conditions of the air at the respective locations of atmospheric supply, room air supply, and room air exhaust in a system incorporating the wheel, do not lie on a straight line. This may be advantageous under certain conditions of operation.

These and other objects, features, and advantages of the invention will become more fully apparent from the following detailed description of the invention, when taken together with the accompanying drawings, in which.

Figure 1:
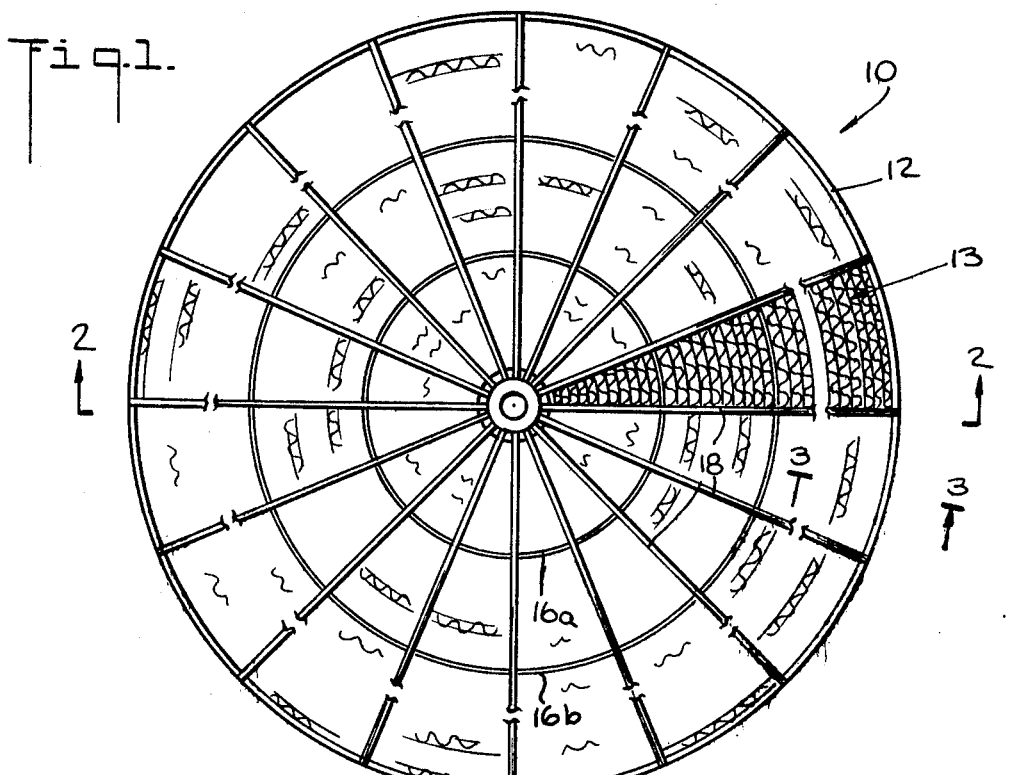
FIG. 1 is a plan view, partly broken away, of a total heat energy recovery and exchange wheel constructed in accordance with the invention.

Although the presently preferred forms of rotary regenerative total heat energy recovery and exchange wheels in accordance with the invention will be described in connection with FIGS. 7-10, a satisfactory alternative embodiment of the invention will first be described with reference to FIGS. 1 and 2. In those figures the wheel is indicated generally by reference numeral 10.

Figure 5:
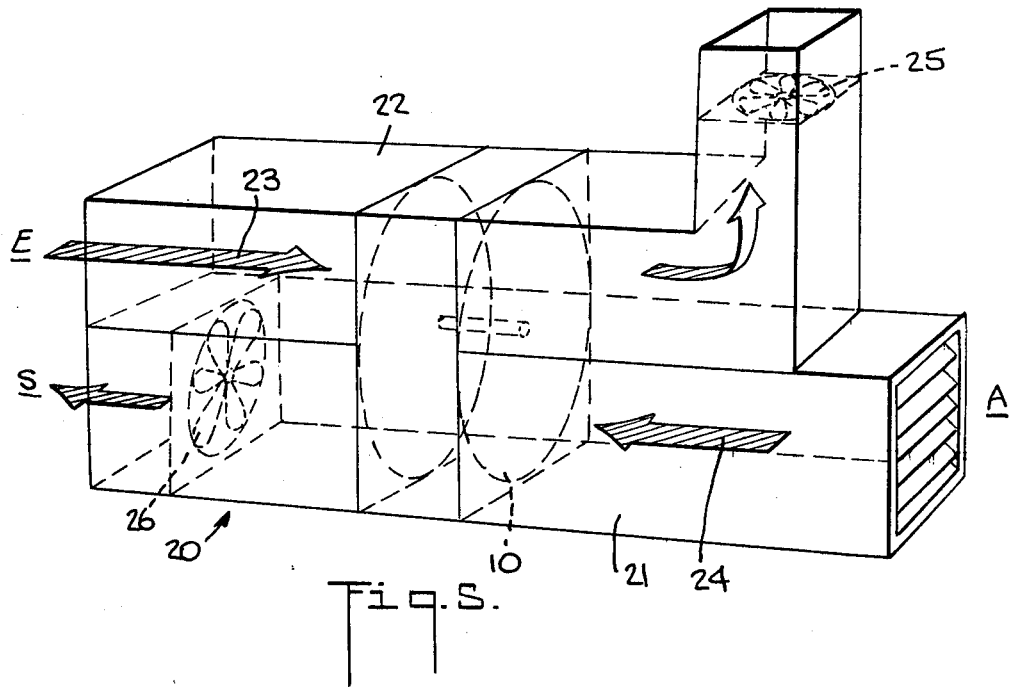
FIG. 5 is a diagrammatic showing of a make-up air supply system having a wheel in accordance with the invention.

As illustrated in FIG. 5, and as is the manner of use of the invention in all of its embodiments, the wheel 10 when incorporated in a make-up air supply system, generally indicated by reference numeral 20, is mounted for rotation spanning across an inlet air duct 21 and an exhaust air duct 22 to transfer both latent and sensible heat energy, accompanied or not by moisture, from the flowing exhaust airstream 23 from a room or the like to the oppositely flowing, fresh air supply airstream 24 from the atmosphere. A fan 25 induces the flow of the exhaust airstream 23 through the wheel 10, and a fan 26 similarly induces the flow of fresh air 24.

Figure 2:
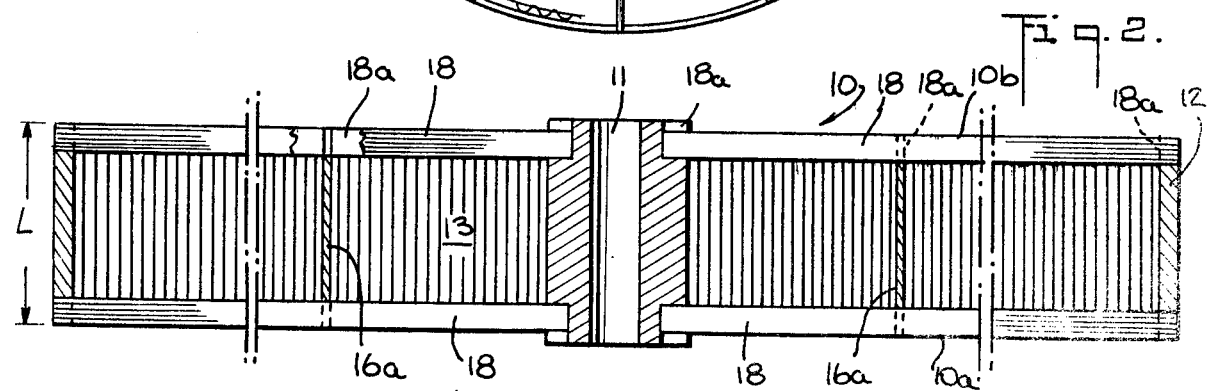
FIG. 2 is a transverse sectional view taken along line 2—2 in FIG. 1.
Figure 3:
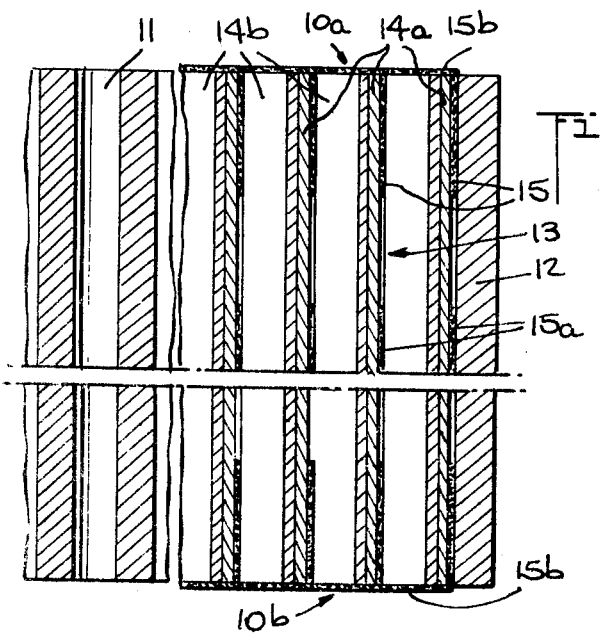
FIG. 3 is a greatly enlarged fragmentary, side-sectional view of the wheel as seen for example from line 3—3 of FIG. 1, showing certain details of its construction.

Referring to FIGS. 1-3, the wheel 10 has a hollow cylindrical metal hub 11 by which it is mounted on a shaft (not shown) for rotation at various fairly low rotational speeds, not more than about 40 r.p.m. Between the metal hub 11 and the metal peripheral rim 12 is a total heat energy and moisture exchange media or packing indicated by numeral 13. The media 13 is made of alternate sheets of flat and corrugated paper whose open-ended corrugations provide a multitude of parallel passages through the wheel in the direction of its depth L, to permit the flow of air therethrough.

The media 13 is preferably formed by spirally winding a continuous strip or web of single-faced corrugated paperboard material on and around the hub 11, thus building up a multi-layered structure. As shown in FIG. 3, each web 14 of corrugated paperboard is formed by a single flat ply 14a and a single corrugated ply 14b, the corrugated ply 14b preferably facing the wheel hub 11 during the winding. The width of the corrugated paperboard web determines the wheel thickness or depth L, and it will thus be understood, particularly from FIG. 2, that in conjunction with the equally wide peripheral metal rim 12, the side edges of the wound corrugated material 14 form the respective opposite end faces 10a and 10b of the wheel, the faces being flush with the respective ends of the outer or peripheral rim 12.

The single-faced corrugated paperboard is made using a conventional silicate type glue between the flat ply 14a and the corrugated ply 14b thereof. Each ply 14a, 14b is a Kraft paper treated with a mixture of ammonium sulfide and diammonium phosphate, which constituents are hygroscopic, and improve the latent heat transfer capabilities of the paper. They also impart a fire-retardent characteristic, and are bacteriostatic in that they inhibit the growth of bacteria, mold and the like in the paper material. These constituents are added to the paper fibres at the time when the paper is made, and together constitute from about 14% to about 20%, preferably 16% by weight of the paper, the paper fibres constituting the remaining 84% of the weight of the paper. A preferred mixture of these salts has been found to be substantially 90% ammonium sulfide and substantially 10% diammonium phosphate by weight. The density of the constituted paper is preferably about 45 lb.

The continuous convolutions of the corrugated paperboard strip 14 are adhesively secured together using neoprene rubber adhesive 15 as shown in FIG. 3. The corrugated strip is similarly adhesively secured to the periphery of the hub 11. The adhesive 15 is initially in liquid form and is applied either by roller to the flat ply 14a of the paperboard in laterally spaced apart continuous strips extending in the direction of winding, as the paperboard is being wound on the hub 11, or by dipping the opposite end faces 10a and 10b after the wheel is formed. However, the most effective technique for applying the adhesive is by penetration spraying, using an airless spray technique, into each of the opposite end faces 10a and 10b of the wheel after the wheel is formed. In any case, the adhesive 15 will be disposed on and between the paperboard layers to a depth of about six inches extending inwardly from each of the end faces 10a and 10b of the finished wheel. The neoprene serves to rigidify the media especially at its end faces to preserve its shape, and also improves the sensible heat transfer capacity of the wheel. Its flexible quality permits expansion and contraction of the media 13 due to changes of temperature and moisture.

As illustrated in FIG. 3, where the adhesive 15 is roller applied during the winding of the paperboard one or more additional strips of adhesive, as indicated by numeral 15a, may be disposed within the depth of the media 13 in spaced relation to the two previously mentioned strips of adhesive. For example, where the wheel depth L is twenty inches, the adhesive strip 15a may be placed midway across the wheel depth.

Where the adhesive 15 is applied by spraying after the wheel has been formed, a coating of the adhesive will form not only on all of the exposed internal surfaces of media plies 14a and 14b but also, as indicated by numeral 15b, on the extreme ends of the plies 14a and 14b as is desirable to present a hard, yet flexible surface to resist wearing of the wheel end faces 10a and 10b as would otherwise be caused by abrasion due to impingement of the airstreams and perhaps dust particles thereon at normally encountered velocities up to about 1000 feet per minute. A similar end coating is attained by dipping the end faces or painting them, as are alternative methods of application.

Although the corrugated paperboard convolutions may be adhesively secured as aforesaid, due to the wheel construction in other respects as will be seen, such adhesive securement as such, is actually unnecessary. That is, although it incidentally and desirably acts as an adhesive, the neoprene coating serves the more important functions of rendering the media bacteriocidal, and strengthens the wheel end faces.

Returning to the construction of the wheel itself, where the outside diameter of the wheel will be more than about 36 inches, the continuous winding of the single-faced corrugated paperboard is terminated and a metal annular band 16a, having width equal to that of the rim 12 is wrapped tightly therearound and secured, as by welding, at a radial location out from the periphery of the hub 11. The annular band is preferably made of steel sheet, e.g., ⅛ inch thick, although it might be of any suitable material. As shown in the drawings, the wheel may have a plurality of such intermediate annular metal bands 16b, etc., each being similarly attached about successive windings of the corrugated material 14 at additional radial locations until the full diameter of the wheel is attained, at which the metal peripheral rim 12 has thickness somewhat greater than that of the annular bands, e.g., ¼ inch, and is also preferably made of steel. For example, a wheel having a diameter of 12 feet may have a 10 inch diameter hub, and have two annular steel bands disposed respectively at the 30 inch and 48 inch radial locations thereof.

Figure 4:
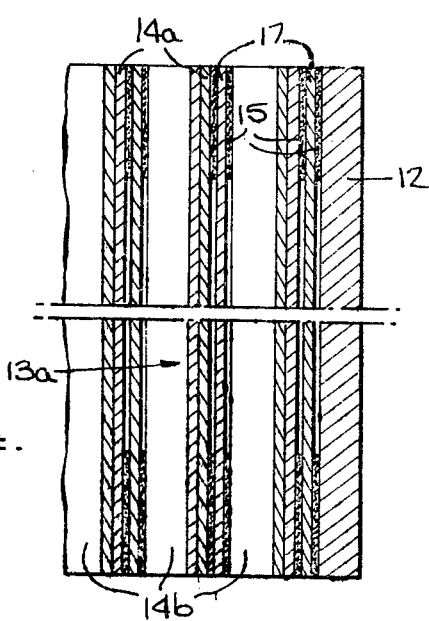
FIG. 4 is a fragmentary view similar to FIG. 2 of a wheel in accordance with a modified form of the invention.

Referring to a modified form of the invention, as illustrated in FIG. 4, the flat layer of the media 13a may also include a metal foil ply 17 interleaved between the plural layers of the single-faced corrugated paperboard. The foil is preferably aluminum foil, having a thickness of about 3 mils. (0.003 inch), and may extend fully across the depth L (FIG. 2) of the media. It is applied in the form of a continuous strip which is wound concurrently with the winding of the strip of corrugated paperboard as previously described, the foil being placed against either the flat ply or the corrugated ply of the paperboard as the winding proceeds and thus being interleaved between the convolutions or layers of the paperboard when the wheel is formed. Strips of neoprene rubber adhesive 15, applied as previously described, adhesively secure the foil to the contiguous laminations of the paperboard.

Alternatively, an appropriate number of shorter strips of aluminum foil may be used to interleave the aluminum at only every, say, third convolution of the paperboard.

The metal foil 17 imparts further rigidity to the wheel structure, and improves the capability of the wheel to transfer sensible heat, as is advantageous in certain applications of the total energy exchange devices in which these wheels are incorporated. However, by its covering of paper areas, the foil will reduce the latent heat transfer capability of the wheel to some extent.

Whether or not the metallic foil strip is incorporated, the wheel has at each of its end faces (10a and 10b) a plurality of angularly spaced apart, radially extending metal spokes 18 which retain the media 13 or 13a in place and further rigidify the wheel structure as a whole. As seen in FIG. 2, the exposed edges of the spokes 18 lie within the planes of the respective end faces 10a and 10b. The illustrated embodiment has 16 such spokes, eight on each side of the wheel, attached between the hub 11 and peripheral rim 12, although fewer or more spokes might be used. Each spoke is 3/16 inch wide steel, and is placed within a correspondingly sized groove 18a (FIGS. 1 and 2) extending radially across the media 13 or 13a and the annular metal bands 16a, 16b etc., the hub 11 and peripheral rim 12 being also grooved to receive the ends of the spoke. Where the wheel depth L is, say, 16 or 20 inches, the depths of each spoke 18 and its corresponding media groove 18a is 4 inches. The width of the grooves 18a is 0.190 inch and their depth is 4.010 inches to receive the 3/16 inch × 4 inch spokes. The spokes 18 on the respective sides of the wheel preferably are, but may not be aligned with each other in the direction of the depth L.

Each spoke 18 is welded to the peripheral rim 12, hub 11, and any intermediate bands 16a, 16b, etc. which it crosses. In addition, to further support the media 13, each spoke 18 is coated with an epoxy resin adhesive before it is placed within its groove 18a, so that the ends of the paperboard 14 will become adhered to the spoke.

Further with regard to the corrugated paperboard heat and moisture transfer media, it has been found that the height of the corrugations of the corrugation ply 14b should not be less than substantially 0.06 inch, to avoid danger that the air passages provided by the corrugations will become clogged with particulate material as may be carried by either of the airstreams passing through the wheel. That is, where what may be termed the diameter of the air passage formed by a corrugation is 0.06 inch, particle sizes of 1000 microns will flow freely through the passage, as would be required to avoid blockage of the passage by particulate matter under normal conditions of operation.

However, considering the mass and exposed surface area of the media, and also the maximum acceptable airstream pressure drop as may be permitted to occur through the media in such total energy recovery systems, it has been found that the length of the air passages formed by the media corrugations, equal to the depth L (FIG. 2), must be a particular multiple of the air passage diameter in order to maintain sensible heat and latent heat energy recovery efficiencies at an acceptably high level. More particularly, it has been found that such multiple must be selected from within the range of from 100 times to 400 times the corrugation height which forms the passage.

For example, selecting the minimum passage diameter of 0.06 inch, where the length of the passage exceeds 400 × 0.06 inch, i.e., L = 24 inches, airstream pressure drop across the wheel becomes greater than 3.2 inches of water, and is considered excessive. Where the length is less than 100 × 0.06 inch, i.e., L = 6 inches, the mass and surface area of the media in the wheel will be too low to maintain acceptably high sensible heat and latent heat transfer efficiencies at normally encountered airstream velocities, and rotating the wheel at appropriate speed.

Similarly, the mass and surface area of the media in the wheel will be too low to maintain acceptable efficiencies where the air passage diameter is made too large, considering that the wheel depth L required to maintain such efficiencies would become so large that the wheel would be too cumbersome and perhaps too costly to build and install, and that the airstream pressure drop across the wheel would become unacceptably high. For example, where the diameter of the air passage is as much as 0.12 inch, the length of the passage should not be less than 12 inches (i.e., 100 × 0.12 inch) for acceptable heat transfer efficiencies, nor more than 48 inches at which the air pressure drop through the wheel becomes excessive.

Moreover, with reference to substantially all-paper wheels, it has been found that where the length of the air passages is substantially 200 times the passage diameter, the optimum conditions exist from the standpoint of heat energy recovery efficiency, cost, and handling of the wheel during building and installation. That is, for example, if the minimum passage diameter of 0.06 inches is selected, the wheel thickness or depth L is optimally 12 inches, and where a maximum passage diameter of 0.12 inch is selected the wheel depth L is optimally 24 inches. For most applications a wheel having 0.10 inches high corrugations, so that it will pass air-carried particles of up to about 2000 microns, and therefore a convenient wheel thickness of 20 inches, is preferred.

The sensible heat and latent heat transfer efficiencies of the described all-paper media are not equal to each other within the range of appropriate rotational speeds of the wheel 10, which is not higher than 40 r.p.m. A latent heat transfer efficiency better than 65% is achieved at an airstream velocity of 900 feet per minute and increasingly higher efficiencies as airstream velocity decreases, the latent heat transfer efficiency becoming greater than 75% at airstream velocities below 450 feet per minute. Similarly, the sensible heat transfer efficiency of the media is greater than 73% at airstream velocity of 900 feet per minute, and increases steadily to better than 81% as the airstream velocity is reduced to 450 feet per minute.

Figure 6:
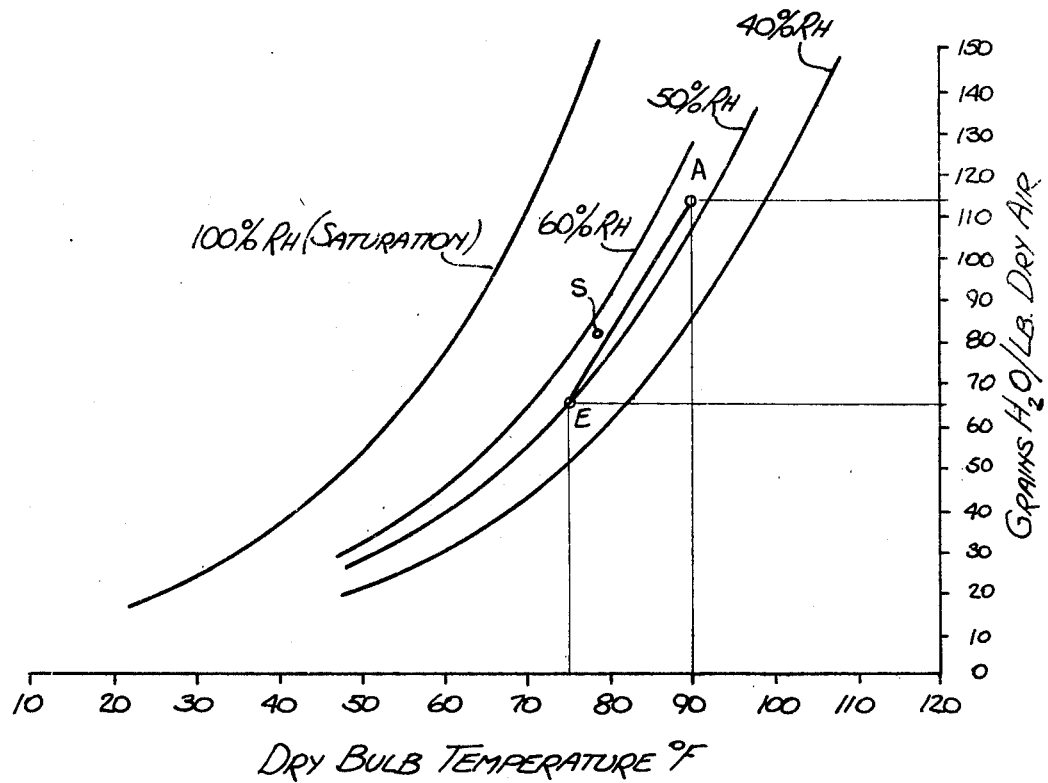
FIG. 6 is a skeletonized showing of a psychrometric chart illustrating a feature of the invention.

With reference to the psychrometric chart shown in FIG. 6 it will be noted that the temperature and humidity conditions of the air at the three significant points of atmospheric air supply (point A), room air supply (point S), and room air exhaust (point E) in a make-up air supply system 20 in which the wheel 10 is installed, do not lie on a straight line. That is, the point S representing the supply air condition of 78.7° F. and 80.3 grains of moisture per pound of dry air, does not lie on the line drawn between the respective points A and E representing those conditions of the outside atmosphere (90° F., 113 gr. H$_2$O/lb. dry air) and of the air being exhausted from the room as the latter enters the exhaust air duct 22 of the system (75° F., 65 gr. H$_2$O/lb. dry air).

Figure 7:
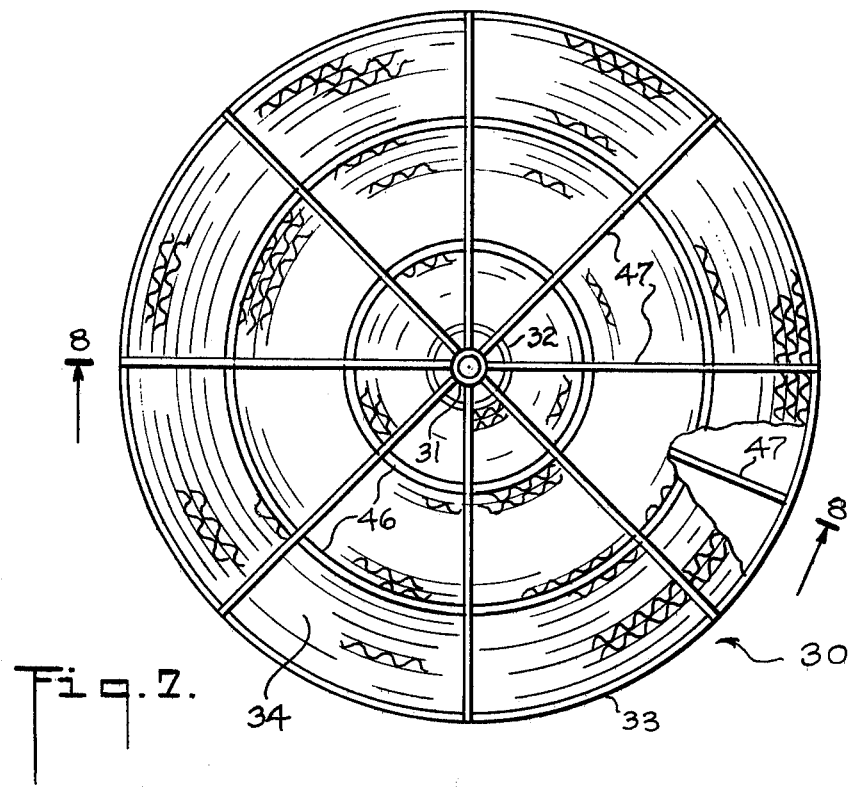
FIG. 7 is a plan view similar to FIG. 1 of another modified, and presently preferred form of total heat energy recovery and exchange wheel constructed in accordance with the invention.
Figure 8:
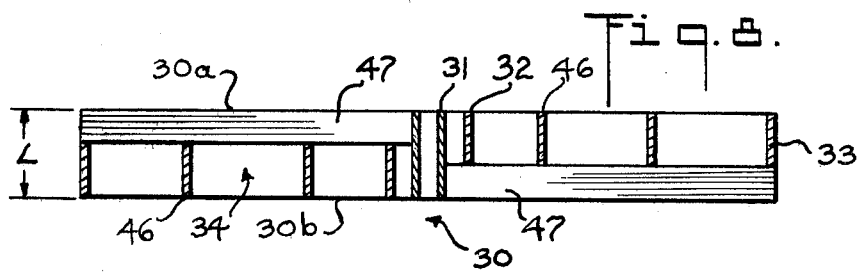
FIG. 8 is a transverse sectional view taken along line 8—8 in FIG. 7.
Figure 9:
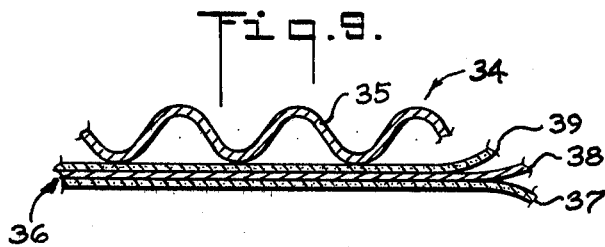
FIG. 9 is an enlarged fragmentary, sectional showing of the arrangement of the corrugated and flat metal foil and paper materials of which the media of the wheel in FIG. 7 is made.

Referring now to FIGS. 7, 8 and 9, a presently preferred form of rotary regenerative total heat energy recovery and exchange wheel in accordance with the invention is indicated generally by reference numeral 30. The wheel 30 has a hollow cylindrical metal hub 31 by which it will be mounted on a shaft (not shown) for rotation at an optimum operating speed of between 15 and 30 r.p.m., preferably less than 20 r.p.m. The wheel 30 further includes a concentric wrapping hub 32 of larger diameter, made of stainless steel or other appropriate metal, and having the same length as the inner hub 31. Thus, both hubs 31 and 32 have length equal to the thickness or depth L of the wheel. As in the previously described embodiment, a concentric metal peripheral rim 33, whose depth is also equal to the depth L of the wheel, defines the wheel area or region, extending radially outward from the wrapping hub 32, within which the total heat energy and moisture exchanged media or packing 34 is contained.

The media 34 is formed of wound corrugated and flat strips or webs of sheet material as illustrated in FIG. 9. That is, the media 34 has a plurality of layers of corrugated sheets 35 of aluminum foil material, and a corresponding plurality of interleaved layers of flat sheet material generally indicated by reference numeral 36, the latter being formed by separate, flat paper and aluminum foil plies. Each flat layer 36 has a lower paper strip or ply 37, a flat aluminum foil ply 38, and a second or upper paper ply 39 which lies adjacent to the corrugated aluminum layer or ply 35. Although one or more of the corrugated and flat layers 35, 36 might be adhesively tacked or secured to its immediately adjacent layer, it has been found that none of these layers need be adhesively secured, but that the unsecured layers will be tightly held when wound on the wrapping hub 32, in manner as will be described. However, for expediency during the wrapping process, to avoid protrusions of paper on either face of the wheel due to slight inaccuracies of feeding during the winding process, the depth L of each paper ply 37 and 39 is made approximately ½ inch smaller than the depth L of the aluminum foil plies 35 and 38, the paper plies 37 and 39 being centered with respect to the aluminum plies 35 and 38 so that the aluminum plies extend to, and define the opposite end faces 30a and 30b of the wound wheel 30.

Figure 10:
FIG. 10 is a similarly enlarged fragmentary, sectional showing of another arrangement of corrugated and flat metal foil and paper material from which the media might be made.

Alternatively, and as illustrated in FIG. 10, the wheel might be provided with a total heat energy and moisture exchange media or packing 40 whose corrugated layers, generally indicated by reference numeral 41, are formed by contiguous paper and aluminum foil plies as shown, and whose flat layers are formed by the single, flat aluminum foil plies 42. That is, the corrugated layer 41 is a combination layer having a lower corrugated paper ply 43 which lies adjacent to the flat layer 42, an adjacent corrugated aluminum foil ply 44, and an upper corrugated paper ply 45, the depth L of the paper plies being about ½ inch less than that of the aluminum foil plies as in the previously described embodiment. The individual corrugated paper and foil plies 43–45 which form the corrugated layer 41 are preferably adhesively secured to each other to hold their corrugated shapes prior to the forming of the media. However, the flat and corrugated layers 41, 42 need not be adhesively secured or adhesively tacked to each other.

Figure 11:
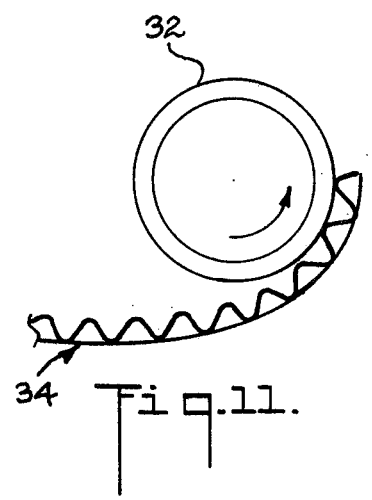
FIG. 11 is a fragmentary and diagrammatic illustration of the manner of making total heat energy recovery and exchange wheels in accordance with the invention.

The wheel 30 is formed by spirally winding continuous strips in the proper lamination sequence on and around the wrapping hub 32, as they are concurrently fed from separate rolls of the paper and metal foil materials, as illustrated in FIG. 11. Preferably, the corrugated layer is placed against, and faces the wrapping hub 32 during the winding. As in the previously described embodiments, the width of the aluminum strips or plies 35, 38 (or 42, 44) determines the wheel thickness or depth L, and it will thus be understood, particularly from FIG. 8, that the side edges of the wound corrugated material 34 (or 40) which form the respective opposite end faces 30a and 30b of the wheel are flush with (i.e., lie within the same plane as) the respective ends of the hub 31, wrapping hub 32, and peripheral rim 33.

The interleaved paper plies 37 and 39 in the case of the media 34, and the paper plies 43 and 45 in the case of the media 40, are of bleached 45 pound density Kraft paper comprising substantially 84% fibres and 16% salts, the salts being 90% ammonium sulfide and 10% diammonium phosphate, as in the previously described embodiments. The paper as manufactured is fire retardent and bacteriostatic. For improved latent heat exchange characteristics in the wheel, the paper as manufactured can further be impregnated with lithium chloride. However, if the paper is impregnated with lithium chloride, then the aluminum plies 35, 38 and 42, 44 must be pre-coated with a thin epoxy resin, or with neoprene to prevent corrosion. Where a neoprene coating is used, the lithium chloride impregnated paper becomes bacteriocidal.

The thickness of each paper ply 37, 39 or 42, 44 is preferably 0.0045 inch, and the thickness of each aluminum foil ply 35, 38 or 42, 44 is preferably 0.003 inch. If stainless steel foil is used instead of aluminum to form the plies 35, 38 or 42, 44, its thickness is preferably 0.002 inch.

The height (and thus substantially the diameter) of the air passage openings formed by each corrugation layer 35 or 41 and its adjacent flat layer 36 or 42 is preferably between 0.055 inch and 0.065 inch, desirably 0.060 inch, such as will pass particulate matter as large as 1000 microns. Thus, the length of the air passages as will be formed by such corrugations, i.e., the depth L of the ply, will be approximately 8 inches, considering that the aforementioned ratio of the length of these air passages to their diameter should be between substantially 125 and substantially 150 where the media is a combination of paper and aluminum foil materials.

Of course, if desired, the adjacent paper and aluminum foil plies and/or layers in either of the medias 34 or 40 may be adhesively secured together using either neoprene rubber adhesive, or a silicate adhesive.

Further, and as illustrated in FIGS. 7 and 8, one or more annular metal bands 46, each having depth equal to L so that its ends will be flush with the wheel faces 30a, 30b as shown, may be disposed concentrically within the wheel media at radially spaced apart locations out from the periphery of the wrapping hub 32, thus to rigidify the wheel construction. Each annular band 46 is preferably made of steel sheet, and is attached about successive windings of the corrugated and flat layered media 34 (or 40).

As in the previously described embodiments, the wheel 30 has at each of its end faces 30a, 30b a plurality of annular spaced apart, radially extending metal spokes 47 which retain the wound media 34 (or 40) in place, and further rigidify the wheel structure. As seen in FIG. 8, each spoke 47 extends radially outward from the mounting hub 31 to the outer peripheral rim 33, to both of which the spoke is welded. The exposed end edges of all of the spokes 47 lie within the planes of the respective end faces 30a and 30b of the wheel. Each spoke is 3/16 inch wide steel, and is placed within a correspondingly sized groove which is milled in radial direction across the face of the media, through the peripheral rim 33, intermediate bands 46, and wrapping hub 32. The depth of each groove and of the corresponding metal spoke which it receives is from 2½ inches to 4 inches, depending upon the wheel diameter. The spokes 47 are tack-welded to the intermediate bands 46 and to the wrapping hub 32, as well as to the rotation hub 31 and peripheral rim 33 as aforesaid.

As a specific example of this preferred form of the invention, the wheel shown in FIGS. 7 and 8 is approximately 76 inches in diameter, and has a depth L equal to 8 inches. It has two intermediate bands whose diameters are approximately 38 inches and 59 inches respectively, each of which is ⅛ inch thick sheet steel. Its peripheral rim 33 is 3/16 inch thick steel, and each of its spokes also has 3/16 inch thickness. The depth of each spoke 47 is 3 inches, and it will be noted that the spokes on either side of the wheel are intermediately disposed with respect to the angular spacing of the spokes on the other side or end face. Thus, at the location of each spoke whose depth is 3 inches, the depth of the media extending beyond the spoke groove to the opposite end face of the wheel is 5 inches. The wrapping hub 32 has a 16 inch outside diameter, and is made of ⅜ inch thick steel. The outside diameter of the hub 31 is 4¾ inch, its thickness also being substantially ⅜ inch. All of the area of each end face 30a, 30b, including the spokes 47 and bands 46, may be spray-coated with dryable neoprene rubber.

However, in smaller sized wheels from about 28 inches to about 38 inches in diameter, and perhaps even in larger diameter wheels, the intermediate bands 46 may be eliminated. Of course, as in the previously described embodiments, the diameter of the wheel 30 may be as large as about 140 inches and, depending upon its size, the wheel may have as few as 4 and as many as 16 spokes 47, whose depth may be from 2½ to 4 inches. The ratio of wheel thickness or depth L to the height of the corrugation flute of the corrugated ply 35 (or 41) of the media is from about 100 to about 400, preferably 125 to 150.

Using either the media 34 or the media 40 it will be found that the latent heat transfer and sensible heat transfer efficiencies are different from each other. For the preferred rotational speed of wheel, which is not higher than about 20 r.p.m., latent heat transfer efficiency exceeds 50% and sensible heat transfer efficiency exceeds 75% where the airstream velocity is below 900 f.p.m. Increasingly higher efficiencies are achieved as airstream velocity decreases.

With reference to the psychrometric chart shown in FIG. 6, assuming the same outside atmospheric condition of air at 90° F. and containing 113 grains of water per pound of dry air (point A) and the same room exhaust condition of air at 75° F. and 65 grains of water per pound of dry air (point E), the point S' representing the supply air condition furnished by the wheel 30 of 78.8° F. and 89.2 grains of moisture per pound of dry air, also does not lie on the line drawn between points A and E.

Thus has been described a total heat energy exchanger in several embodiments, and an air supply system which achieves all of the objects of the invention.

What is claimed is:

1. Total energy exchange apparatus having a media for transferring sensible and latent heat energy, accompanied or not by moisture, between two streams of air within which the apparatus is situated, said media comprising a plurality of layers of corrugated sheet material and a corresponding plurality of layers of flat sheet material, said layers of corrugated and flat sheet materials being interleaved alternately with each other and the corrugations of said layers of corrugated sheet material being parallel to each other so that, together with their respectively adjacent layers of flat sheet material, they provide passages for the flow of said air through said media, the height of the passage openings formed by said corrugations being not less than substantially 0.055 inch nor more than substantially 0.12 inch, and the length of said passages being within the range of from substantially 100 to substantially 400 times said height of said passage openings, said layers of at least one of said pluralities of layers comprising cellulosic paper material treated with ammonium sulfide and diammonium phosphate.

2. Total energy exchange apparatus according to claim 1 wherein said cellulosic paper material is constituted by weight of substantially 84% paper fibres and substantially 16% of said ammonium sulfide and diammonium phosphate.

3. Total energy exchange apparatus according to claim 2 wherein said ammonium sulfide and diammonium phosphate are proportioned substantially 90% by weight of ammonium sulfide and substantially 10% by weight of diammonium phosphate.

4. Total energy exchange apparatus according to claim 1 wherein said cellulosic paper material is fully bleached Kraft paper having density of about 45 pounds and thickness of from about 4 mils (0.004 inch) to about 6 mils (0.006 inch).

5. Total energy exchange apparatus according to claim 1 wherein said layers of both of said pluralities of layers are of said cellulosic paper material, and said length of said media passages is substantially 200 times said height of the passage openings.

6. Total energy exchange apparatus according to claim 1 wherein said layers of at least one of said pluralities of layers comprise metal foil material.

7. Total energy exchange apparatus according to claim 6 wherein each layer of said one plurality of layers comprises a ply of said cellulosic paper and a metal foil ply, and said length of said media passages is within the range of from substantially 125 to substantially 150 times said height of the passage openings.

8. Total energy exchange apparatus according to claim 7 wherein said one plurality of layers is said plurality of corrugated layers, said cellulosic paper ply being disposed on one surface of said metal foil ply, and each layer of said plurality of corrugated layers further comprises a second ply of said cellulosic paper disposed on the opposite surface of said metal foil ply.

9. Total energy exchange apparatus according to claim 7 wherein said one plurality of layers is said plurality of flat layers, said cellulosic paper ply being disposed on one surface of said metal foil ply, and each layer of said plurality of flat layers further comprises a second ply of said cellulosic paper on the opposite surface of said metal foil ply.

10. Total energy exchange apparatus according to claim 1 wherein said interleaved layers are adhesively secured to each other by neoprene rubber adhesive.

11. Total energy exchange apparatus having a media for transferring sensible and latent heat energy, accompanied or not by moisture, between two streams of air within which the apparatus is situated, said media comprising a hub, a plurality of layers of corrugated sheet material and a corresponding plurality of layers of flat sheet material interleaved alternately with each other, said pluralities of layers being formed by winding respective strips of each of said materials on and around said hub whereby said media is disposed within an annular area extending outwardly from said hub and the respective side edges of at least alternate ones of said strips are substantially coplanar and constitute the respectively opposite end faces of said wound media, the corrugations of said layers of corrugated sheet material being parallel to each other so that, together with their respectively adjacent layers of flat sheet material, they provide for the flow of said air through said media, the height of the passage openings formed by said corrugations being not less than substantially 0.055 inch nor more than substantially 0.12 inch, and the length of said passages being within the range of from substantially 100 to substantially 400 times said height of said passage openings, said layers of at least one of said pluralities of layers comprising cellulosic paper material, an annular metal band circumscribing and supporting said media in its said wound relation, and means retaining said opposite end faces of said wound media within their respective planes, said strips of corrugated and flat sheet materials being the respective plies of single-faced corrugated paperboard and each being fully bleached, 45 lb. density Kraft paper having a thickness of from about 4 mils (0.004 inch) to about 6 mils (0.006 inch) and constituted by weight of substantially 84% paper fibres and substantially 16% ammonium sulfide and diammonium phosphate, said ammonium sulfide and diammonium phosphate being proportioned substantially 90% by weight of ammonium sulfide and substantially 10% by weight of diammonium phosphate.

12. Total energy exchange apparatus according to claim 11 wherein the convolutions of said wound single-faced corrugated paperboard are adhesively secured together by neoprene rubber adhesive.

13. Total energy exchange apparatus according to claim 11 which further comprises metal foil spirally wound concurrently with at least some of the convolutions of said wound single-faced corrugated paperboard.

14. In a make-up air supply system having a total energy exchange wheel mounted for rotation spanning across an air supply duct leading from the outside atmosphere into a room or the like and a parallel adjacent exhaust air duct from said room to said outside atmosphere, the improvement comprising a media for said wheel providing parallel tubular passages aligned with said airstreams for the passage of air through said wheel, the diameter of each of said passages being not less than substantially 0.055 inch nor more than substantially 0.12 inch and the length of said passages being within the range of from substantially 100 to substantially 400 times said passage diameter, said media comprising cellulosic paper material constituted by substantially 84% by weight of paper fibres and substantially 16% by weight of ammonium sulfide and diammonium phosphate, and the temperature and humidity conditions of the air received in said room through said media being in other than straight line relationship, when plotted on a psychrometric chart, with the temperature and humidity conditions of said outside atmosphere and said room air.

15. In a make-up air supply system, the improvement according to claim 14 wherein said media further comprises a plurality of corrugated metal foil strips interleaved with flat metal foil strips, said paper being in the form of a plurality of paper strips interleaved with said corrugated and flat metal foil strips, the corrugations of said corrugated metal foil strips and their respectively adjacent flat strips defining said passages, the height of said corrugations being between substantially 0.055 inch and substantially 0.065 inch, and the length of said passages being from substantially 125 to 150 times said height of said corrugations.

16. In a make-up air supply system, the improvement according to claim 15 wherein the height of said corrugations in substantially 0.060 inch, and the length of said passages is substantially 8 inches.

17. In a make-up air supply system, the improvement according to claim 14 wherein said media comprises spirallywound single-faced corrugated paperboard, the corrugations thereof defining said passages, the height of said corrugations being substantially 0.10 inch and the length of said passages being substantially 20 inches.

18. Total energy exchange apparatus having a media for transferring sensible and latent heat energy, accompanied or not by moisture, between two streams of air within which the apparatus is situated, said media comprising a hub, a plurality of layers of corrugated sheet material and a corresponding plurality of layers of flat sheet material interleaved alternately with each other, said pluralities of layers being formed by winding respective strips of each of said materials on and around said hub whereby said media is disposed within an annular area extending outwardly from said hub and the respective side edges of at least one of said strips are substantially coplanar and constitute the respectively opposite end faces of said wound media, the corrugations of said layers of corrugated sheet material being parallel to each other so that, together with their respectively adjacent layers of flat sheet material, they provide passages for the flow of said air through said media, and means retaining said media in its said wound relation, said corrugated sheet material comprising metal foil material, and said flat sheet material comprising a ply of flat metal foil material and a ply of fire-retardant cellulosic paper material.

19. Total energy exchange apparatus according to claim 18 wherein the width of said paper is less than the width of said corrugated and flat metal foil and is centered on the latter, whereby said opposite end faces of said media are formed only by said side edges of the corrugated and flat metal foil.

20. Total energy exchange apparatus according to claim 18 wherein two strips of said cellulosic paper are respectively disposed on the opposite surfaces of one of said metal foil strips, each of said paper strips having thickness of from about 4 mils (0.004 inch) to about 6 mils (0.006 inch).

21. Total energy exchange apparatus according to claim 20 wherein said metal foil is aluminum foil having thickness of about 0.003 inch, and said cellulosic paper is substantially 45 pound density Kraft paper constituted by weight of substantially 84% paper fibres and substantially 16% ammonium sulfide and diammonium phosphate, said ammonium sulfide and diammonium phosphate being proportioned substantially 90% by weight of ammonium sulfide and substantially 10% by weight of diammonium phosphate.

22. Total energy exchange apparatus according to claim 20 wherein said metal foil is stainless steel having thickness of about 0.002 inch, and said cellulosic paper is substantially 45 pound density Kraft paper constituted by weight of substantially 84% paper fibres and substantially 16% ammonium sulfide and diammonium phosphate, said ammonium sulfide and diammonium phosphate being proportioned substantially 90% by weight of ammonium sulfide and substantially 10% by weight of diammonium phosphate.

23. Total energy exchange apparatus according to claim 18 wherein said metal foil material is aluminum.

24. Total energy exchange apparatus according to claim 18 wherein said metal foil material is stainless steel.

* * * * *